United States Patent
Schaeuble et al.

(10) Patent No.: US 8,222,890 B2
(45) Date of Patent: Jul. 17, 2012

(54) INDUCTIVE DISPLACEMENT TRANSDUCER, CODING DEVICE, AND METHOD FOR DETECTING A POSITION OF A FIRST OBJECT IN RELATION TO A SECOND OBJECT

(75) Inventors: Caroline Schaeuble, Mannheim (DE); Christian Speckmann, Bensheim (DE); Bernhard Weiskopf, Mannheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 356 days.

(21) Appl. No.: 12/675,280

(22) PCT Filed: Aug. 28, 2008

(86) PCT No.: PCT/EP2008/007061
§ 371 (c)(1),
(2), (4) Date: Mar. 17, 2010

(87) PCT Pub. No.: WO2009/030432
PCT Pub. Date: Mar. 12, 2009

(65) Prior Publication Data
US 2010/0308803 A1 Dec. 9, 2010

(30) Foreign Application Priority Data
Aug. 31, 2007 (DE) .......................... 10 2007 041 219

(51) Int. Cl.
*G01B 7/14* (2006.01)
*G06K 7/00* (2006.01)
(52) U.S. Cl. ................................... 324/207.15; 235/440
(58) Field of Classification Search ............. 324/207.11, 324/207.15; 235/440, 462.17
See application file for complete search history.

(56) References Cited

U.S. PATENT DOCUMENTS
4,760,827 A 8/1988 Schreiber et al.
(Continued)

FOREIGN PATENT DOCUMENTS
DE 39 10873 A1 10/1990
(Continued)

OTHER PUBLICATIONS
Kurze, Volker, "International Search Report", International Application No. PCT/EP2008/007061, Date of Completion, Jan. 7, 2009.
(Continued)

*Primary Examiner* — Bot Ledynh
(74) *Attorney, Agent, or Firm* — John A. Merecki; Hoffman Warnick LLC

(57) ABSTRACT

The invention relates to an inductive displacement sensor for determining a position of a first object relative to a second object having a coding device to be attached to the first object, having a sensor unit to be attached to the second object, said sensor unit comprising a plurality of inductive sensors for scanning the coding device. The inductive displacement sensor according to the invention is characterized in that the coding device comprises a plurality of marking sections separated from one another by measurement sections, at least the measurement sections having variable widths, in that the marking sections and the measurement sections have different physical properties to aid differentiation by the sensor unit, in that identification regions are formed by the measurement sections or by the measurement sections along with adjacent marking sections, in that the sensor unit is at least long enough in the extension direction of the coding device and the number of inductive sensors is at least great enough that at least one identification region may be detected in every measurement situation, and in that, in order to distinctly associate an identification region with an absolute position of the sensor unit relative to the coding device, each identification region occurs precisely once on the coding device. The invention further relates to a coding bar and a method for determining a position of a first object relative to a second object.

20 Claims, 4 Drawing Sheets

U.S. PATENT DOCUMENTS 5,894,678 A 4/1999 Masreliez et al.
6,271,661 B2 8/2001 Andermo et al.

FOREIGN PATENT DOCUMENTS

| DE | 197 58 104 A1 | 7/1999 |
| DE | 198 13 803 C1 | 1/2000 |
| DE | 10 2006 010 161 A1 | 8/2007 |
| GB | 2 126 444 A | 3/1984 |
| WO | WO 2005/012840 | 2/2005 |

OTHER PUBLICATIONS

PCT, "International Preliminary Report on Patentability", International Application No. PCT/EP2008/007061, International Filing Date Aug. 28, 2008, 5 pages.

INDUCTIVE DISPLACEMENT TRANSDUCER, CODING DEVICE, AND METHOD FOR DETECTING A POSITION OF A FIRST OBJECT IN RELATION TO A SECOND OBJECT

FIELD OF THE INVENTION

The present invention relates, in a first aspect, to an inductive displacement transducer for detecting a position of a first object in relation to a second object.

In further aspects, the invention relates to a coding device and to a method for detecting a position of a first object in relation to a second object.

RELATED ART

Such displacement transducers and methods are known and are employed for a large number of industrial processes.

A displacement transducer of the generic type for detecting a position of a first object in relation to a second object has a coding device for attachment to the first object and a sensor unit for attachment to the second object, which sensor unit comprises a plurality of inductive sensors for scanning the coding device.

In a method of the same type for detecting a position a first object in relation to a second object, a coding device attached to the first object is scanned by a sensor unit attached to the second object, which sensor unit comprises a plurality of inductive sensors.

Usually such displacement transducers are used in the form of incremental displacement transducers, wherein two periodic switching signals are generated which are phase-shifted by 90°.

In numerous applications it is desirable to detect the absolute position of an object without previously fixing a reference point.

SUMMARY OF THE INVENTION

The present invention provides an inductive displacement transducer, a coding device, and a method, by means of which an absolute position of a first object in relation to a second object can be reliably detected in a simple manner.

Embodiments of the inductive displacement transducer of the invention, the coding device of the invention, and the method of the invention are the subject matter of the dependent claims and are individually described below, in particular with reference to the figures.

The inductive displacement transducer of the aforementioned type is characterized, according to the invention, in that the coding device comprises a plurality of marking sections separated from one another by measurement areas, of which at least the measurement areas have variable widths, that the marking sections and the measurement areas have different physical properties to assist differentiation thereof by the sensor unit, that identification areas are formed by the measurement areas or by the measurement areas together with their adjacent marking sections, that the sensor unit is at least long enough in the direction of extension of the coding device and a number of the inductive sensors is at least large enough to ensure that at least one identification area can be detected in any measuring situation and that, to enable an identification area to be uniquely assigned to an absolute position of the sensor unit in relation to the coding device, each identification area is present only once on the coding device.

The coding device of the invention is characterized by a plurality of marking sections separated from one another by measurement areas, of which at least the measurement areas have variable widths, which marking sections and measurement areas have different physical properties to assist differentiation thereof by a sensor unit, identification areas being formed by the measurement areas or by the measurement areas together with adjacent marking sections, and each identification area is present only once.

The method of the aforementioned type is developed, according to the invention, in that the coding device has a plurality of marking sections which are separated from one another by measurement areas, of which at least the measurement areas have variable widths, that the marking sections and the measurement areas have different physical properties to assist differentiation thereof by the sensor unit, that identification areas are formed by the measurement areas or by the measurement areas together with their adjacent marking sections, that the sensor unit is at least long enough in the direction of extension of the coding device and the number of inductive sensors is at least large enough to ensure that in any measuring situation the locality of at least one identification area can be detected, that each identification area is present only once on the coding device and that the absolute position of the sensor unit in relation to the coding device is uniquely derived from the identification area.

A concept of the invention can be regarded as the fact that the coding device is made such that the individual marking sections are no longer disposed strictly equidistantly, but rather the intervals between the individual marking sections in the coding device of the invention provide information concerning the absolute position. This makes it possible to detect the absolute position.

Another concept in this context may be regarded as being the fact that the coding device is made such that each identification area is present only once. This makes it possible to detect an absolute position uniquely without other information being required, such as a fixed starting point.

In a variant of the invention, the sensor unit is designed such that in any measuring situation the localities of at least two adjacent marking sections can be detected.

For the purposes of the present invention, the term "scanning" used herein generally means the contactless detection of localities, for example, of the marking sections. For example, a relative position of a certain marking section or a certain measurement area in relation to the sensor unit is detected by reason of a certain physical property of the marking section and/or of the measurement area.

An advantage of the invention can be seen in the fact that very simple means are implemented to reliably detect an absolute position, which signifies that they can be used even under extremely harsh industrial conditions.

In an embodiment of the coding device each width of the measurement areas is present only once on the coding device.

In an advantageous and readily installed and deinstalled variant the coding device is in the form of a code bar.

Theoretically, the coding device can alternatively be formed by a plurality of separate metal flags acting as marking sections or measurement areas.

Finally, it is also possible to mount the coding device on a curved orbit such that rotary movements can be monitored.

In a variant of the method of the invention, the width of the measurement area disposed between said marking sections is derived from the localities of two adjacent marking sections, and the absolute position of the sensor unit in relation to the coding device is uniquely derived from the width of said measurement area.

The identification areas can be formed either by the measurement areas alone or by the measurement areas together with one or both of their adjacent marking sections. In the case of simple variants, the marking sections have, for example, two different sizes or widths in order to enlarge the code set.

Even more simple are embodiments in which the width of the marking sections is in all cases constant. In such cases the identification areas are formed by the measurement areas.

In the present invention, in order not to restrict a measured length, i.e. a length which can be used for absolute detection of a position, to the length of a sensor, a plurality of marking sections, for example, damping elements, are accordingly attached to a bar and their position in relation to one another is additionally detected. Since a certain relative position is present only once on the bar, it is in this way possible to detect an absolute position. In the present invention, the code bar is constructed such that always at least two marking sections, for example, damping elements, are located in front of the sensor.

In order to ensure that two marking sections are reliably differentiated, they must be at a minimum distance from one another. Likewise, the relative spacing differences between two marking sections, which can be referred to as flags, are at least large enough to ensure that they can be reliably differentiated from one another.

In an embodiment of the inductive displacement transducer of the invention, the marking sections and the measurement areas display different electrical conductivities. For example, the marking sections can be electrically conductive and the measurement areas electrically non-conductive. Metrology-related differentiation of the marking sections and the measurement areas is then possible in a simple manner with the aid of the inductive sensors.

Basically, it may be advantageous and preferable for certain applications when the marking sections and the measurement areas have different permeabilities.

The aforementioned properties are effected in a variant that is simple to produce, in which the marking sections are metal flags of metal sheeting and the measurement areas are clearances in the metal sheeting.

Evaluation of the measuring signals from the inductive sensors in the sensor unit is very simple to achieve when the inductive sensors in the sensor unit are spaced at equal intervals.

In order to ensure that the marking sections are reliably recognized, they must possess a minimum width. Marking sections of smaller width can be recognized when the inductive sensors are more densely distributed in the sensor unit. A denser arrangement of the sensors in the sensor unit can be effected by disposing the inductive sensors in several, more particularly parallel, rows, for example in two rows offset from one another.

The reliability of detection of the absolute position can be improved by designing the sensor unit such that it is at least long enough in the direction of extension of the code bar and the number of inductive sensors is at least large enough to ensure that in any measuring situation the width of at least two measurement areas can be detected.

Nevertheless, in order to keep the length of the sensor unit in the direction of extension in this situation as small as possible, the code bar is advantageously designed such that, substantially, a comparatively long measurement area is followed by a comparatively short measurement area. Expressed quantitatively, the measurement areas on the code bar can be distributed such that for every other marking section the sum of the widths of its two adjacent measurement areas does not deviate from the average by more than 10%. In this way, the sensor length required for measurement can be minimized. If the distance between the marking sections, which may also be referred to as targets, were to be regularly increased from one marking section to the next, there would be only very short widths at the beginning of the code bar, but only large widths in its end region, for which, however, a correspondingly longer sensor would be necessary.

The present invention provides a system in which for every other marking section the sum of the widths of its adjacent measurement areas is constant. Since, in this variant, every other marking section is spaced from the next marking section but one by a constant distance, such code bars may also be advantageously used in conjunction with incremental displacement transducers.

The design of the code bar allows for numerous variants. Thus the minimum distance between the marking sections, the minimum width differences between the measurement areas, and also a maximum width of the measurement areas, for example, can be varied.

Finally, the code set can be enlarged by using various flag widths so that a coding of the position can be effected not only via the spacing of the flags but also via a width of the flags. In this variant, the marking sections thus have a variable width.

Furthermore a plurality of code bars can be lined up in the direction of extension. A travel path with an already exhausted code set can in this way be subsequently modified by attaching a bar section showing one or more of the aforementioned modifications. The read head, that is to say, the sensor unit, must in this case be adjusted to the different new rasters.

Additionally or alternatively, in order to enlarge the code set and thus prolong the maximum distance to be monitored, a plurality of code bars may also be arranged parallel to one another. In another embodiment of the invention the sensor units are of modular design. If it is then necessary to provide a longer sensor unit, in order to monitor a larger travel path, a plurality of sensor units can be lined up in the direction of extension for the purpose of enlarging a maximum detectable width of a measurement area. By this means, considerable simplification is achieved with regard to the individual configuration of travel paths to be monitored.

BRIEF DESCRIPTION OF THE DRAWINGS

Further advantages and features of the invention are described below with reference to the attached figures, in which.

DETAILED DESCRIPTION OF THE INVENTION

An exemplary embodiment of an inductive displacement transducer of the invention and a code bar of the invention are described with reference to FIGS. 1 to 3. Equivalent components in the figures are indicated by identical reference signs.

Figure 1:
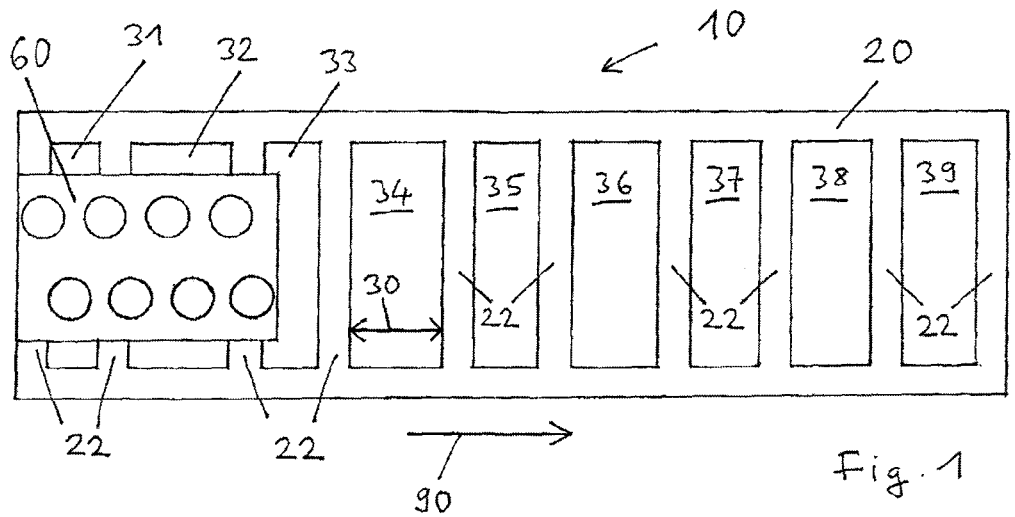
FIG. 1 is a diagrammatic view of an inductive displacement transducer of the invention.
Figure 2:
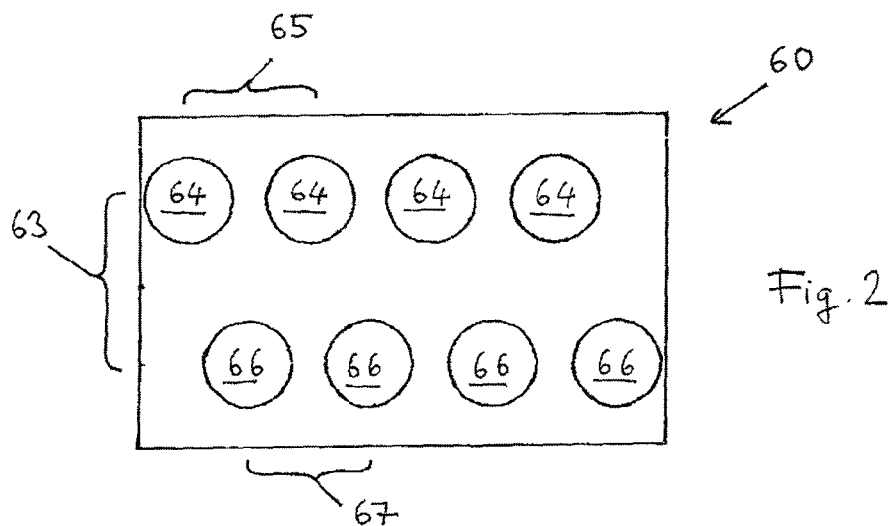
FIG. 2 is a diagrammatic view of a sensor unit in the inductive displacement transducer shown in FIG. 1.

The inductive displacement transducer 10 of the invention illustrated diagrammatically in FIG. 1 includes a code bar 20 of the invention and a sensor unit 60, also referred to as a read head, having a plurality of inductive sensors 64, 66. Details of the sensor unit 60 are shown in FIG. 2. Accordingly, there are disposed on the sensor unit 60 a total of eight inductive sensors 64, 66 in two parallel rows. The inductive sensors 64, 66 in the rows are spaced from one another by equal distances, as indicated by the brackets 65, 67. The rows themselves are spaced from each other by a distance indicated by the bracket 63.

Figure 3:
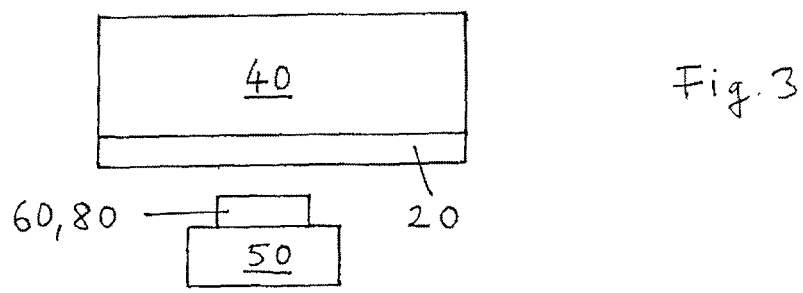
FIG. 3 is a diagrammatic view of a measuring situation for an inductive displacement transducer of the invention.

As shown diagrammatically in FIG. 3, the code bar 20 is attached to a first object 40 and the sensor unit 60 to a second object 50. Using the thus formed inductive transducer of the invention and the method of the invention, it is possible to detect an absolute position of the second object 50 in relation to the first object 40.

The code bar 20 consists of a metal sheet, in which clearances are formed, which are in each case interrupted by fins or marking sections 22 of equal widths as regarded in the direction of extension 90, and by means of which measurement areas 31 to 39 are formed, as proposed according to the invention. For example, the measurement areas 31 to 39 can be punched into the metal sheet. The width of the marking sections 22 in the example shown is 25 mm.

Unlike the marking sections 22, the widths of the measurement areas 31 to 39 differ from each other, as regarded in the direction of extension 90, while according to the invention each width is present only once. In this way it is possible to uniquely detect the absolute position of the first object 40 in relation to the second object 50. The width of a measurement area in the direction of extension 90 is indicated in FIG. 1 for the measurement area 34 by a double arrow 30.

In the example shown in FIG. 1, the sequence of widths 30 of the measurement areas 31 to 39, in mm, is as follows: 40, 80, 45, 75, 50, 70, 55, 65, 60. Thus the sum of the widths of each of the pairs 31, 32; 33, 34; 35, 36, and 37, 38 of measurement areas is always constant. The code bar 20 shown in FIG. 1 can therefore also be used for incremental measurements.

The depicted length of the sensor unit 60 in the direction of extension 90 of the code bar 20 is slightly greater than the sum of the widths of two measurement areas and the three marking sections. Thus at least three marking sections 22 are always covered by the sensor unit 60 and can accordingly be evaluated with regard to the location thereof. In the housing in which the inductive sensors 64, 66 are accommodated, a control and evaluation unit 80 can be provided, by means of which the inductive sensors can be supplied with power, controlled, and evaluated with regard to their data.

Figure 4:
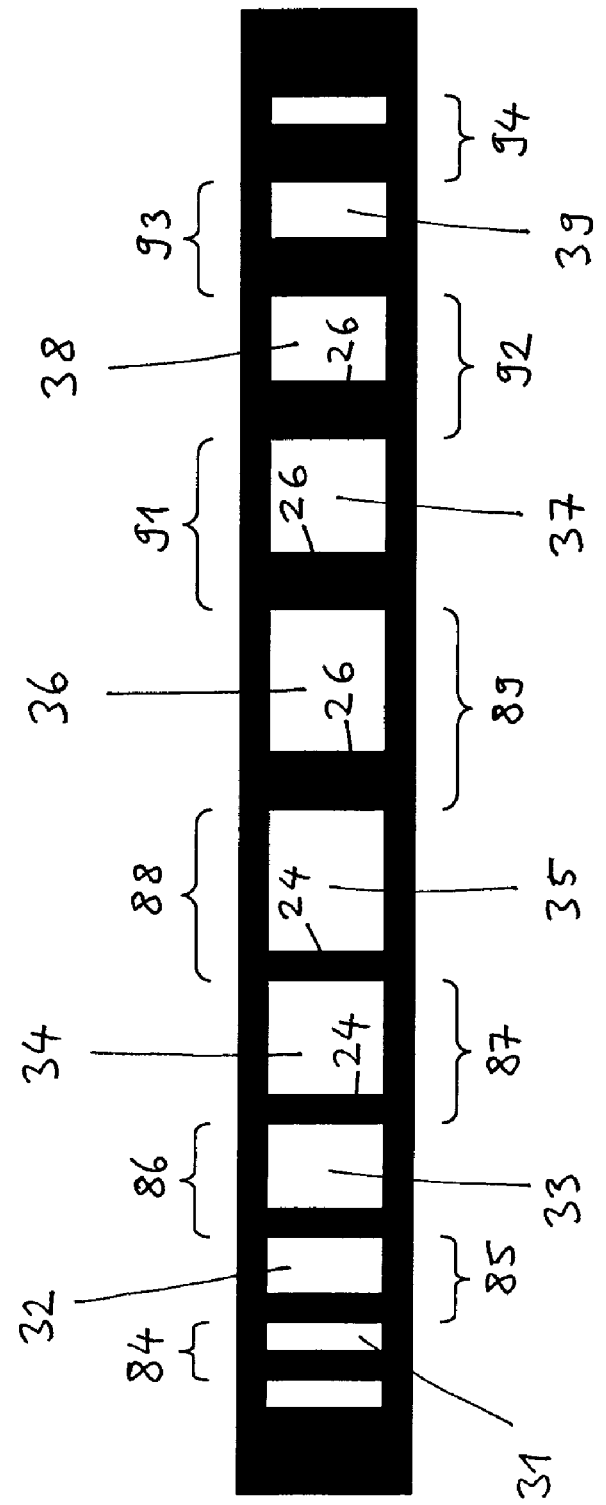
FIG. 4 is a diagrammatic view of an embodiment of a code bar of the invention.

FIG. 4 shows an embodiment of a code bar 20 functioning as a coding device, in which identification areas 84 to 89 and 91 to 94 are formed by measurement areas 31 to 39 respectively, which are formed by clearances in a metal sheet in combination, in each case, with an adjacent marking section 24, 26. In order to enlarge the code set, the marking sections 24, 26, which are metal flags, have different widths. By this means the code set in the example shown is doubled.

Figure 5:
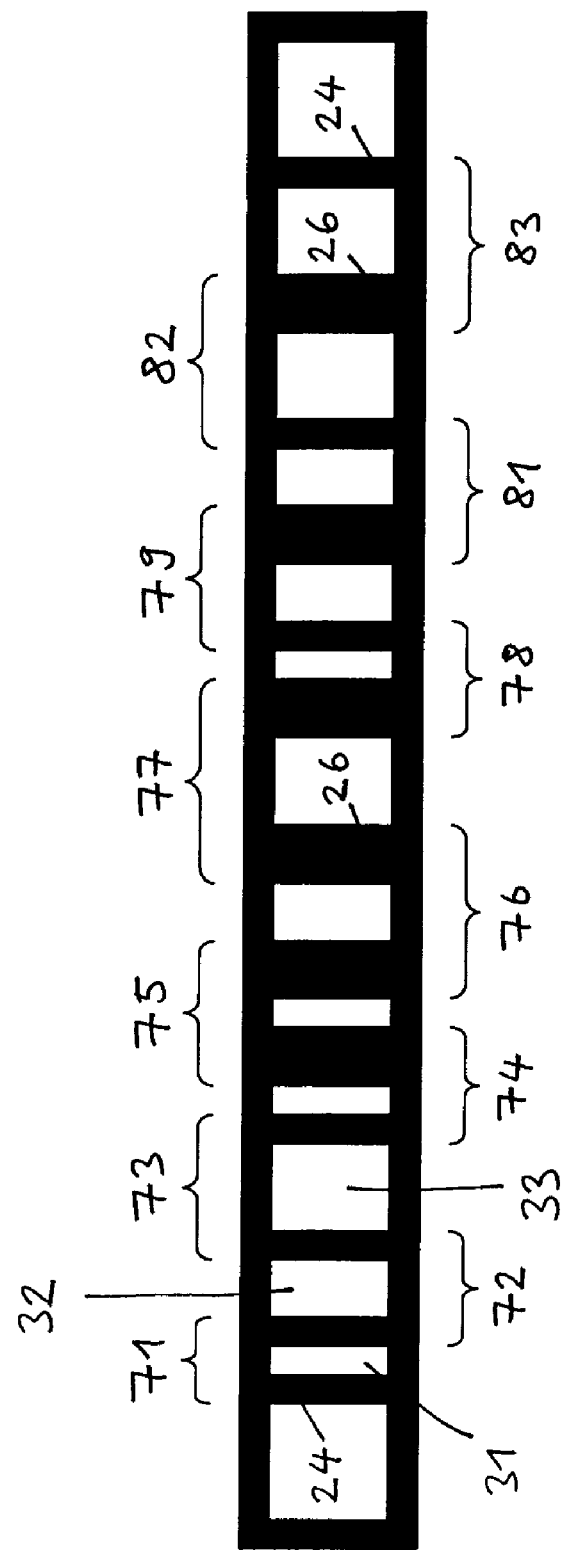
FIG. 5 is a diagrammatic view of another embodiment of a code bar of the invention.

FIG. 5 shows another code bar 20, in which identification areas 71 to 79, and 81 to 83 are formed by a total of three different measurement areas 31, 32, 33, which are combined with a left-hand and right-hand marking section 24, 26, which, as in the example shown in FIG. 4 can have two different widths. This makes it possible to further enlarge the code set and, in particular, to allow measurement areas having the same width to be present several times on the code bar 20.

Figure 6:
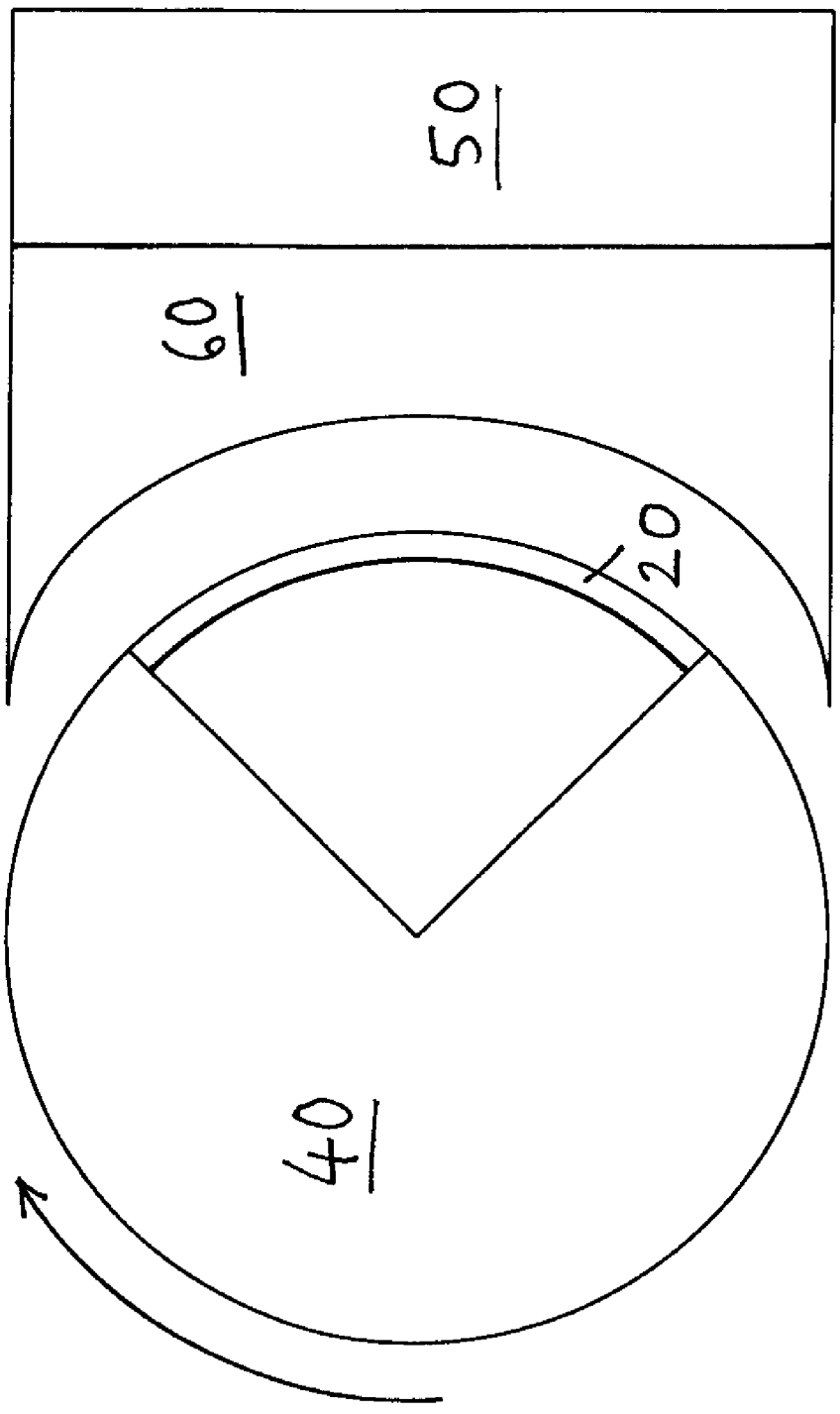
FIG. 6 is a diagrammatic view of a measuring situation in which a curved code bar is electronically scanned.

FIG. 6 diagrammatically shows the arrangement of a code bar 20 on a curved orbit on a cylindrical object 40 whose rotary movement is monitored with the aid of a displacement transducer of the invention comprising the sensor unit 60 and the code bar 20. Basically, tracing of a curved code bar 20 could be carried out with an inwardly disposed sensor unit 60.

A novel principle for detecting an absolute position using the above invention is described below. The inductive displacement transducer of the invention comprises a read head and a coding or position-finding bar formed in a special manner and containing information concerning the absolute position. The sensor unit, which is also referred to as a read head, can be composed of a certain number of inductive oscillator circuits or oscillators spaced at specified equal distances from one another. The spacing of the individual oscillators in relation to one another can be uniquely specified by the structure of the code bar or is in any case adapted to the code bar in actual use. The evaluation of the location can, for example, be effected by evaluating in each case the second highest damping signal of the inductive sensors, as disclosed in WO 2005/012840 A1, which is included in the present specification by reference.

The coding or position-finding bar comprises marking sections, which may also be referred to as damping flags or targets, and also measurement areas which can, for example, be gaps or clearances in a metal sheet. It is possible, by way of different intervals between two successive targets and the corresponding arrangement of the different distances between the marking sections, which are equal to the widths of the measurement areas on the code bar, to uniquely discern an absolute position in relation to the read head. In one embodiment of the invention, all of the marking sections exhibit a constant minimum width of defined size. This width can theoretically be arbitrarily extended by adding the sensor spacing in the read head thereto once or a number of times. An important advantage is that the arrangement of two successive position-determining intervals between marking sections can be selected such that for a given width of the marking spacing, the distance from one marking section to the next marking section but one can be kept constant.

For the purpose of detecting the position, the sensor head or read head must read the position of at least two marking sections on the segmented code bar, in order to detect the distance between them. By measuring individual elements and determining the position thereof there is accordingly provided information concerning the absolute position of a first object in relation to a second object. The spacing and the position of the damped coil in the read head can thus be implemented to detect the absolute position of the read head in relation to the code bar.

The code set can, as described above, be enlarged in diverse ways. For example, an inverse code bar can be attached in which, for example, the marking sections, hitherto in the form of metal flags in the first code bar, are now corresponding clearances stamped in a metal sheet. In addition, a multitrack code system may be advantageous for applications in which a larger code set is required.

Finally the code's structure can alternatively be established by other intervals than those specified by a bit number. Thus it is essential to the invention that the width coding for the marking sections be effected differently from that for the measurement areas.

The invention claimed is:

1. A coding device for an inductive displacement transducer, comprising:
  a plurality of marking sections separated by measurement areas having variable widths, wherein information concerning an absolute position is contained in the intervals between individual marking sections, wherein the marking sections and the measurement areas have different physical properties to assist differentiation thereof by a sensor unit, wherein identification areas are formed by the measurement areas alone or by the measurement areas together with one or both adjacent marking sections, and wherein each identification area is present exactly once.

2. The coding device as defined in claim 1, wherein the coding device comprises a code bar.

3. The coding device as defined in claim 1, wherein the coding device comprises a plurality of separate metal flags acting as the marking sections or the measurement areas.

4. A coding device as defined in claim 1, wherein the coding device is disposed on a curved orbit.

5. An inductive displacement transducer for detecting a position of a first object in relation to a second object, comprising:

a coding device for attachment to the first object, the coding device comprising a plurality of marking sections separated by measurement areas having variable widths, wherein information concerning an absolute position is contained in the intervals between individual marking sections, wherein the marking sections and the measurement areas have different physical properties to assist differentiation thereof by a sensor unit, wherein identification areas are formed by the measurement areas alone or by the measurement areas together with one or both adjacent marking sections, wherein each identification area is present exactly once and comprises a sensor unit for attachment to the second object, the sensor unit comprising a plurality of inductive sensors for scanning the coding device, wherein the inductive sensors in the sensor unit are equally spaced from one another, and wherein the sensor unit is at least long enough in a direction of extension to ensure that in any measuring situation the width of at least two of the measurement areas can be detected.

6. The displacement transducer as defined in claim 5, wherein the marking sections and the measurement areas have different electrical conductivities.

7. The displacement transducer as defined in claim 6, wherein the marking sections are electrically conductive and the measurement areas are electrically non-conductive.

8. The displacement transducer as defined in claim 5, wherein the marking sections and the measurement areas have different magnetic permeabilities.

9. The displacement transducer as defined in claim 5, wherein the marking sections comprise metal flags of metal sheeting and the measurement areas comprise clearances in the metal sheeting.

10. The displacement transducer as defined in claim 5, wherein the inductive sensors are disposed in a plurality of rows offset from one another.

11. The displacement transducer as defined in claim 5 wherein the inductive sensors are disposed in two rows offset from one another.

12. The displacement transducer as defined in claim 5, wherein the measurement areas are distributed on the coding device such that for every other marking section a sum of the widths of its adjacent measurement areas does not deviate from an average by more than 10%.

13. The displacement transducer as defined in claim 12, wherein for every other marking section the sum of the widths of its adjacent measurement areas is constant.

14. The displacement transducer as defined in claim 5, wherein a plurality of coding devices are disposed parallel to one another.

15. The displacement transducer as defined in claim 5, wherein a plurality of coding devices are aligned in the direction of extension.

16. The displacement transducer as defined in claim 5, wherein for enlarging a maximum detectable width of a measurement area, a plurality of sensor units are aligned in the direction of extension.

17. The displacement transducer as defined in claim 5, wherein the marking sections have variable widths.

18. The displacement transducer as defined in claim 5, wherein each measurement area width is present exactly once on the coding device.

19. A method for detecting the position of a first object in relation to a second object, in which a coding device attached to the first object is electronically scanned by a sensor unit attached to the second object which sensor unit has a plurality of inductive sensors, wherein the coding device comprises a plurality of marking sections separated from each other by measurement areas having variable widths, wherein information concerning an absolute position is contained in the intervals between individual marking sections, wherein the marking sections and the measurement areas have different physical properties to assist differentiation thereof by the sensor unit, wherein identification areas are formed by the measurement areas alone or by the measurement areas together with one or both adjacent marking sections, wherein the sensor unit is at least long enough in a direction of extension and a number of the inductive sensors of the sensor unit is at least large enough such that in any measuring situation a location of at least one of the identification areas can be detected, and wherein each identification area is present exactly once on the coding device, and the absolute position of the sensor unit in relation to the coding device is uniquely derived using the identification area.

20. The method as defined in claim 19, wherein the width of the measurement area disposed between the marking sections is derived from the locations of two adjacent marking sections and wherein the absolute position of the sensor unit in relation to the coding device is uniquely derived from the width of the measurement area.

* * * * *